US006011757A

United States Patent [19]

Ovshinsky

[11] Patent Number: 6,011,757

[45] Date of Patent: Jan. 4, 2000

[54] OPTICAL RECORDING MEDIA HAVING INCREASED ERASABILITY

[76] Inventor: Stanford R. Ovshinsky, 2700 Squirrel Rd., Bloomfield Hills, Mich. 48013

[21] Appl. No.: 09/013,733

[22] Filed: Jan. 27, 1998

[51] Int. Cl.[7] .............................. G11B 11/00; G11B 7/00; B32B 3/00

[52] U.S. Cl. ....................... 369/13; 428/64.1; 430/270.13

[58] Field of Search ................................ 369/275.2, 121, 369/288, 283, 13; 428/64.6, 64.5, 64.1, 64.2, 64.4; 430/270.13, 270.11, 945

[56] References Cited

U.S. PATENT DOCUMENTS

| | | | |
|---|---|---|---|
| 5,652,036 | 7/1997 | Kobayashi | 428/64.1 |
| 5,709,978 | 1/1998 | Hirotsune et al. | 430/270.13 |

*Primary Examiner*—Ali Neyzari
*Attorney, Agent, or Firm*—Philip H. Schlazer; Marvin S. Siskind; David W. Schumaker

[57] ABSTRACT

An optical recording medium comprising one or more recording layers. At least one of the recording layers comprising an optical phase-change memory material, the optical phase-change memory material comprising: an optical phase-change alloy; and at least one modifier element, added to the optical phase-change alloy, that increases the erasability of the optical recording medium by at least 3 dB.

15 Claims, 1 Drawing Sheet

60
50
40
30
20
10

OPTICAL RECORDING MEDIA HAVING INCREASED ERASABILITY

FIELD OF THE INVENTION

The invention disclosed herein relates generally to optical recording media and more specifically to optical recording media having a recording layer comprising optical phase-change memory materials.

BACKGROUND OF THE INVENTION

Non-ablative, optical phase-change data storage systems, record information in an optical phase-change memory material that is switchable between at least two detectable states by the application of optical energy. Optical phase-change memory material is typically incorporated in an optical recording medium having a structure such that the optical phase-change memory material is supported by a substrate and protected by encapsulants. In the case of optical recording media, the encapsulants include, for example, anti-ablation materials and layers, thermal insulation materials and layers, anti-reflection materials and layers, reflective layers, and chemical isolation layers. Moreover, various layers may perform more than one of these functions. For example, anti-reflection layers may also be anti-ablation layers and thermal insulating layers. The thicknesses of the layers, including the layer or layers of optical phase-change memory material, are engineered to minimize the energy necessary for effecting the state change as well as to optimize the high contrast ratio, high carrier-to-noise ratio and high stability of the optical phase-change memory materials.

Formation of optical recording media includes deposition of the individual layers by, for example, evaporative deposition, chemical vapor deposition, and/or plasma deposition. As used herein plasma deposition includes sputtering, glow discharge, and plasma assisted chemical vapor deposition.

An optical phase-change material is capable of being switched from one detectable state to another detectable state or states by the application of optical energy. The state of the phase-change changeable material is detectable by properties such as, for example, index of refraction, optical absorption, optical reflectivity, or combinations thereof. Tellurium based materials have been utilized as phase-change materials for data storage where the change is evidenced by a change in a physical property such as reflectivity. Tellurium based state changeable materials, in general, are single or multi-phased systems. The ordering phenomena of such materials includes a nucleation and growth process (including both or either homogeneous and heterogeneous nucleations) to convert a system of disordered materials to a system of ordered and disordered materials. The vitrification phenomena includes attaining a high mobility state and rapid quenching of the phase changeable material to transform a system of disordered and ordered materials to a system of largely disordered materials. The above phase changes and separations occur over relatively small distances, with intimate interlocking of the phases and gross structural discrimination, and may be highly sensitive to local variations in stoichiometry. The instant invention provides for high speed transformation by passing through a high mobility state. This high mobility state allows for high speed transformation from one state of relative order to another. The high mobility state does not specifically correspond to the molten state, but more accurately corresponds to a state of high system mobility.

Generally, a laser is used to supply the optical energy to cause the phase transitions between amorphous and crystalline states in an optical phase-change memory material. The amount of energy applied to the memory material is a function of both the power of the laser as well as the period of time that the laser pulse is applied. The crystallization energy is defined herein as the amout of energy per unit volume needed to substantially re-crystallize an amorphous region of the memory material. The crystallization energy is dependent upon many factors, including the energy necessary for nucleation during the crystallization process.

If the crystallization energy is too high, the memory material requires exposure to either a higher power laser pulse or a longer laser pulse in order to convert the material from the amorphous to the crystalline states. It is desireable to be able to control the crystallization energy of a phase-change memory material via the addition of one or more modifier elements. It is also desirable to increase the erasability of optical recording media.

SUMMARY OF THE INVENTION

One object of the present invention is an optical storage medium having reduced energy requirements. Still another object of the present invention is an optical recording media having increased erasability.

These and other objects of the invention are satisfied by an optical recording medium comprising one or more recording layers, at least one of the recording layers comprising an optical phase-change memory material comprising: an optical phase-change alloy; and at least one modifier element, added to the phase-change alloy, that increases the erasability of the optical recording medium by at least 3 dB.

These and other objects of the invention are also satisfied by an optical data storage and retrieval system comprising: an optical drive means with an optical head for reading, writing and erasing optical data to an optical recording medium, the optical recording meium comprising one or more recording layers, at least one of the recording layers comprising optical phase-change memory material comprising: an optical phase-change alloy; and at least one modifier element, added to the optical phase-change alloy, that increases the erasability of the recording medium by at least 3 dB.

DETAILED DESCRIPTION OF THE INVENTION

Figure 1:
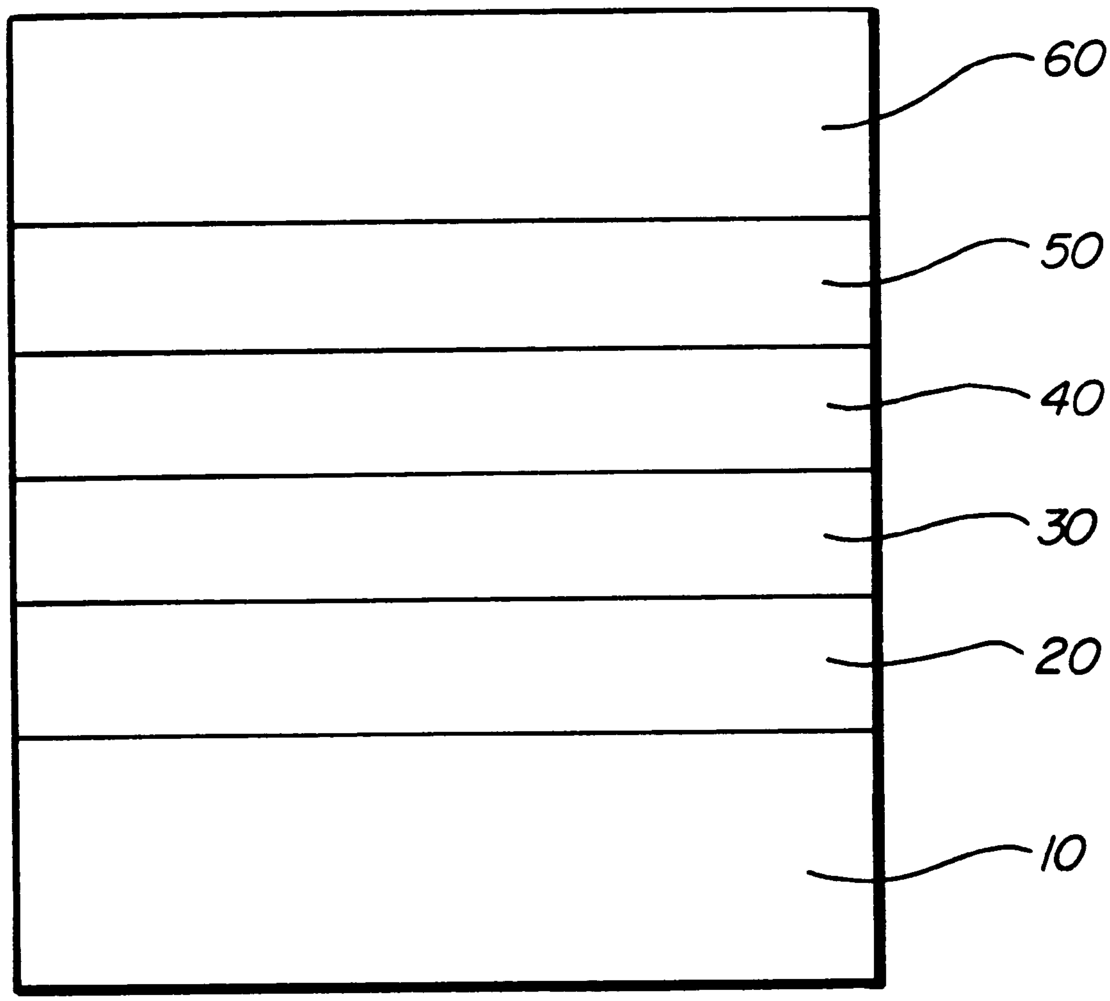
FIG. 1 depicts a highly stylized view of a cross-section of a multi-layered optical disk.

Disclosed herein is an optical phase-change memory material comprising an optical phase-change alloy, and at least one modifier element which is added to the optical phase-change alloy. Generally, the optical phase-change alloy of the present invention may be any material that (1) has an amorphous state and a crystalline state, (2) is capable of being switched between the amorphous and crystalline states in response to optical energy, and (3) undergoes a detectable change in either index of refraction, optical absorption, or optical reflectivity when switched between the amorphous and crystalline states. The optical phase-change memory material of the present invention is formed by modifying the above-mentioned phase-change alloy by adding at least one modifier element to the optical phase-change alloy to form a modified material. The phase-change alloy that is modified by the addition of at least one modifier element to form an optical phase-change memory material is referred to herein as the "corresponding unmodified phase-change alloy".

As described, the optical phase-change memory material of the present invention comprises an optical phase-change alloy, and at least one modifier element which is added to the optical phase-change alloy. Preferably, the modifier element, when added to the optical phase-change alloy, decreases the crystallization energy of the optical phase-change alloy by at least 5%. More preferably, the modifier element, when added to the optical phase-change alloy, decreases the crystallization energy of the optical phase-change alloy by at least 10%. In other words, the optical phase-change memory material has a crystallization energy which is preferably at least 5% lower, and more preferably at least 10% lower, than the crystallization energy of the corresponding phase-change alloy.

As defined herein, the "crystallization energy" is the amount of energy per unit volume to substantially re-crystallize an amorphized volume of phase-change material. The energy needed to crystallize the volume of phase-change material may be supplied by a laser beam pulse having power P and pulse width W. The amount of energy E delivered to the amorphized volume is P×W. The percentage difference in crystallization energy between (1) the phase-change memory material of the present invention and (2) the corresponding unmodified phase-change alloy can be measured under "static" test conditions by irradiating sample volumes of each (1) and (2) with a laser beam having power P and pulse width W and measuring the optical reflectivities of the samples.

As described above, the optical phase-change memory material of the present invention comprises an optical phase-change alloy, and at least one modifier element added to the phase-change alloy. Disclosed herein is an optical recording medium comprising one or more recording layers. At least one of the recording layers comprises the optical phase-change memory material described above (i.e., the optical phase-change memory material comprises an optical phase-change alloy, and at least one modifier element added to the phase-change alloy). In one embodiment of the present invention, each of the recording layers comprises the optical phase-change memory material described above.

Preferably, the optical recording medium of the present invention has an erasability which is at least 3 dB greater than the erasability of an "unmodified" optical recording medium (having the same structure) wherein each of the recording layers is formed from the corresponding unmodified optical phase-change alloy. More preferably, the optical recording medium of the present invention has an erasability which is at least 5 dB greater than the erasability of the unmodified optical recording medium. Any optical recording medium having the characteristics described above falls within the scope of the invention.

In one embodiment, the optical recording medium of the present invention has one recording layer. The recording layer is formed from the optical phase-change memory material of the present invention (i.e., an optical phase-change alloy that has been modified with the addition of at least one modifier element). Preferably, this optical recording medium has an erasability that is at least 3 dB greater than the erasability of an "unmodified" optical recording medium (with the same structure) wherein said recording layer is formed from the corresponding unmodified phase-change alloy. More preferably, the erasability of the optical recording medium is at least 5 dB greater than the erasability of the unmodified optical recording medium. Any optical recording medium having the characteristics described above falls within the scope of the invention.

In another embodiment, the optical recording medium of the present invention has two or more recording layers. At least one of the optical recording layers comprises the optical memory material described herein (i.e., an optical phase-change alloy that has been modified with the addition of at least one modifier element). Preferably, this optical recording medium has an erasability that is at least 3 dB greater than the erasability of an "unmodified" optical recording medium (with the same structure) wherein each of the recording layers is formed from the corresponding unmodified phase-change alloy. More preferably, the erasability of the optical recording medium is at least 5 dB greater than the erasability of the unmodified optical recording medium. Any optical recording medium having the characteristics described above falls within the scope of the invention.

"Erasability" is defined herein as the difference between the carrier-to-noise ratio of the recorded signal (the "record CNR") and the carrier-to-noise ratio after erase (the "erase CNR") of an optical recording medium (i.e., erasability=record CNR−erase CNR). The record CNR is the ratio of the power of a carrier frequency signal recorded onto the medium to the power of the noise level of the medium. This is conventionally expressed as: record CNR=20*$\log_{10}$(rms voltage of the recorded signal/rms noise voltage). The erase CNR is the carrier-to-noise ratio of the signal recorded into the medium after that portion of the medium, where the signal was recorded, has been subjected to an erase procedure.

The values of both the record CNR and the erase CNR vary with the record power $P_w$ used. Hence, the erasability measurements will also vary with the record power $P_w$. As noted above, the addition of the modifier element to the optical phase-change alloy increases the erasability of the optical recording medium by at least 3 dB. This 3 dB (or greater) increase will occur at least at some record power $P_w$ which is between the "threshold power" $P_{threshold}$ and the "ablation power" $P_{abltation}$. The threshold power $P_{threshold}$ is defined herein as that power, below which, there is no measureable record signal which can be distinguished from the noise. The ablation power $P_{ablation}$ is defined herein as that power, above which, the material will begin to ablate and become disfunctional. Preferably, erasability measurements are made at an "optimal record power" $P_{opt}$. An example of an optical record power $P_{opt}$ at which the erasability measurements may be made is the record power where the second harmonic record CNR is minimized.

There are many examples of structures of optical recording media. In one type of optical recording medium, the recording layer is sandwiched between a first dielectric layer and a second dielectric layer. In one embodiment of this type of optical recording medium, the optical recording medium comprises at least a substrate, a first dielectric layer deposited on top of the substrate, a recording layer deposited on top of the first dielectric layer, and a second dielectric layer deposited on top of the recording layer. An example of a multi-layered optical recording medium is shown in FIG. 1. In this example, the storage medium 1 includes a substrate 10, a first dielectric layer 20 deposited on top of the substrate 10, a recording layer 30 deposited on top of the first dielectric layer 20, a second dielectric layer 40 deposited on top of the recording layer, a reflective layer 50 deposited on top of the second dielectric layer 40, and a protective coating layer 60 deposited on top of the second dielectric layer. The substrate 10 may be formed from polycarbonate or other similar material. Preferably, the substrate 10 is a substantially optically invariant, substantially optically isotropic, transparent sheet. The preferred thickness is between about 0.6 mm to about 1.2 mm. The substrate 10 is typically injection molded but can be formed by other methods. Grooves may be placed in the substrate for guiding the light delivered by a laser source. The grooves may be polymerized, molded, injection molded or cast molded into the substrate 10. Preferably, the thickness of the grooves may be from about 200 to about 1000 Angstroms.

First and second dielectric layers 20, 40 sandwich the recording layer 30. A primary function of the first and second dielectric layers 20,40 is to optimize the reflectivity of the optical source so as to maximize the amount of optical energy delivered to the memory material from said source. Optimization requires an appropriate choice for the "optical thickness" of the first and second dielectric layers 20, 40. The optical thickness of a layer of material is defined as the index of refraction of the material multiplied by the physical thickness of the layer.

Preferably, the first and second dielectric layers are chosen from a dielectric material having an optical index of refraction between 1.5 and 2.5. More preferably, the optical index of refraction is chosen between 2.0 and 2.2. Materials which may be used for the first and second dielectric layers include, but are not limited to, germanium oxide ($GeO_2$), silicon dioxide ($SiO_2$), zinc sulfide (ZnS), aluminum dioxide, titanium oxide, and silicon nitride. The materials may be used individually or in combination. One or both of the dielectric layers 20, 40 may be layered or graded to avoid diffusion into the recording layer 30.

As well as optimizing the reflectivity of the optical source, the first and second dielectric layers 20, 40 provide a means for thermally insulating the recording layer 30. Moreover, they may also act to prevent agents which could chemically change the memory material from penetrating the recording layer 30. As well, they may also prevent the substrate 10 from deforming when the memory material is heated by the optical source during recording or erasing.

A reflective layer 50 may be deposited on top of the second dielectric layer 40. The reflective layer 50 increases the quantity of reflected light entering the memory layer. It also influences the thermal environment of the memory layer by providing a thermal sink that encourages rapid cooling. In general, the reflective layer is formed from a thin-film metal. Preferred are high reflectance materials such as Al, Au, Ag, Pt, Cu, Ti, Ni, Pd or alloys thereof. The reflective layer is preferably about 30 to about 150 nm thick. The reflective layer is preferably formed by physical deposition methods such as sputtering and evaporation.

A protective layer 60 may be deposited on top of the reflective layer 50 for the purpose of improving scratch and corrosion resistance. It is preferably formed from organic materials such as acrylates. More preferably, the protective layer 60 is formed from radiation-curable compounds and compositions which are cured by exposure to radiation (typically electron radiation and ultraviolet radiation). The protective layer 60 is preferably about 0.1 to about 15 micrometers thick. It may be formed by any desirable one of conventional coating methods including spin coating, gravure coating, or spray coating.

In another example of a structure of an optical recording medium, the optical recording medium may comprise at least a substrate, a first protective layer, a recording layer, and a second protective layer. Examples of this type of multi-layered structure are described in U.S. Pat. No. 5,063,097, the disclosure of which is incorporated by reference herein. In yet another example of a structure of an optical recording medium, the recording medium may comprise at least a substrate, a lower dielectric layer, a recording layer, a first upper dielectric layer, and a second upper dielectric layer. This type of multi-layered structure is described in U.S. Pat. No. 5,498,507, the disclosure of which is incorporated by reference herein. In still another example of a structure of an optical recording medium, the recording medium may comprise at least a substrate, a first reflective layer, a first dielectric layer, a recording layer, a second dielectric layer, and a second reflective layer.

The optical recording medium of the present invention comprises one or more recording layers. The optical recording medium of the present invention may have one recording layer. The optical recording medium may have two recording layers. The optical recording medium may have three recording layers. The optical recording medium may have four recording layers. The optical recording medium may have five recording layers. The optical recording medium may have six recording layers. The optical recording medium may have seven recording layers. The optical recording medium may have eight recording layers. The optical recording medium of the present invention may have more than eight recording layers.

As defined above, the optical phase-change memory material of the present invention comprises an optical phase-change alloy, and at least one modifier element added to the phase-change alloy. As described above, the optical phase-change alloy of the present invention may be any material that (1) has an amorphous state and a crystalline state, (2) is capable of being switched between the amorphous and crystalline states in response to optical energy, and (3) undergoes a detectable change in either index of refraction, optical absorption, or optical reflectivity when switched between the amorphous and crystalline states.

Preferably, the modifier element is selected from the group consisting of V, Cr, Mn, Fe, Co, Mo, Ru, Rh, Ta, W, Re, Os, and Ir. More preferably, the modifier element is selected from the group consisting of Fe, Cr, and Mo. Most preferably, the modifier element is Fe.

As defined herein, the "atomic percentage" of an element, is the percentage of that element, per number of atoms, within the optical phase-change memory material. In one embodiment, the modifier element is added to the optical phase-change alloy so that the atomic percentage of the modifier element is between 0.06 and 1.0.

When Fe is used as the modifier element, it is preferable that the atomic percentage of Fe is between 0.06 and 1.0, it is more preferable that the atomic percentage of Fe is between 0.08 and 0.8, it is most preferable that the atomic percentage is about 0.3. In an alternate embodiment, the atomic percentage of Fe may be about 0.1.

As defined above, the crystallization energy of a material is the amount of energy per unit volume necessary to substantially re-crystallize an amorphized volume of phase-change material. Crystallization can be divided into two basic steps: (1) the formation of nuclei, and (2) the growth of said nuclei into crystals. The nucleation process may be either homogeneous nucleation or heterogeneous nucleation. Generally, the amount of energy needed for heterogeneous nucleation is less than that required for homogeneous nucleation. Though not wishing to be bound by theory, it is believed that the modifier element adds heterogeneous nucleation sites to the optical phase-change alloy. The addition of heterogeneous nucleation sites reduces the amount of energy necessary for nucleation and thereby reduces the crystallization energy of the phase-change material. Further, the decrease in crystallization energy of the phase-change material increases the erasability of the optical recording medium using the phase-change material. It is believed that at atomic percentages below about 0.06, the modifier element does not provide enough heterogeneous nucleation sites to favorably affect the nucleation characteristics of the material, and at atomic percentages that are above about 1.0, the modifier element has no additional beneficial effect, and can in some cases deleteriously affect the desirable characteristics of the phase-change material.

In one embodiment of the present invention, the optical phase-change alloy comprises Ge, Sb, and Te. This is defined herein as a GeSbTe phase-change alloy. In one embodiment, the ratio of Ge atoms to Sb atoms to Te atoms (i.e., Ge:Sb:Te) is chosen as approximately 4:1:5 to form a "4:1:5 alloy". Preferably, the optical phase-change alloy comprises Ge, Sb, Te in the ratio $Ge_wSb_xTe_y$ where $36 \leqq w \leqq 42$, $7 \leqq x \leqq 13$, and $48 \leqq y \leqq 54$. More preferably, w+x+y=100%. The modifier element is added to the GeSbTe phase-change alloy to form the optical phase-change memory material of the present invention.

In another embodiment, the ratio of atoms Ge:Sb:Te is chosen as approximately 1:2:4 to form a "1:2:4 alloy". Preferably, the optical phase-change alloy comprises Ge, Sb, Te in the ratio $Ge_wSb_xTe_y$ where $11 \leqq w \leqq 17$, $25 \leqq x \leqq 31$, and $53 \leqq y \leqq 59$. More preferably, w+x+y=100%. The modifier element is added to the GeSbTe phase-change alloy to form the optical phase-change memory material of the present invention.

In another embodiment, the ratio of atoms Ge:Sb:Te is chosen as approximately 2:2:5 to form a "2:2:5 alloy". Preferably, the optical phase-change alloy comprises Ge, Sb, Te in the ratio $Ge_wSb_xTe_y$ where $19 \leqq w \leqq 25$, $19 \leqq x \leqq 25$, and $53 \leqq y \leqq 59$. More preferably, w+x+y=100%. The modifier element is added to the GeSbTe phase-change alloy to form the optical phase-change memory material of the present invention.

The modifier element Fe may be added to the optical phase-change alloy to form an optical phase-change memory material comprising Ge, Sb, Te, and Fe. As discussed, the atomic percentage of Fe is preferably between 0.06 and 1.0 percent, more preferably between 0.08 and 0.8 percent, and most preferably about 0.3 percent. Specific examples of the optical phase-change memory material comprising the above-mentioned phase-change alloy include, but are not limited to, $(Ge_{39}Sb_{10}Te_{51})_{99.7}Fe_{0.3}$, $(Ge_{14}Sb_{28}Te_{56})_{99.7}Fe_{0.3}$ $(Ge_{22}Sb_{22}Te_{56})_{99.7}Fe_{0.3}$.

In another embodiment of the present invention optical phase-change alloy comprises Ge, Sb, Te, and Se. This is defined herein as a GeSbTeSe phase-change alloy. As is discussed in U.S. Pat. No. 5,278,011, herein incorporated by reference, the element Se may be used to slow the crystallization process of the phase-change alloy thereby making it easier to form the amorphous phase. The Se retards crystallite formation during the vitrification process as the material forms its final structure during relaxation from the high mobility state. Preferably, the Se is substituted for the Te and is added to the phase-change alloy so that it makes up about 5 to 15 atomic percent of the resulting composition. More preferably, selenium is added so that it makes up about 5 to 11 atomic percent of the composition. Most preferably, selenium is added so that it makes up about 7 to 10 atomic percent of the composition. In one embodiment selenium makes up about 7 atomic percent of the composition. In another embodiment selenium makes up about 8 percent of the composition. In yet another embodiment selenium makes up about 9 percent of the composition. In yet another embodiment, selenium makes up about 10 percent of the composition.

Selenium retards the formation of crystallites in the amorphous state. Compositions with concentrations of Se higher than about 15 atomic percent have crystallization speeds that are too low. Additionally, compositions with concentrations of Se lower than about 5 atomic percent have higher crystallization speeds that favor formation of the crystalline phase, thereby requiring a higher power for amorphization.

In one embodiment of the present invention, the optical phase-change alloy is formed by substituting between 5 and 11 atomic percent of Se for Te in the 4:1:5 alloy described above. Hence, it is preferable that the phase-change alloy comprises Ge, Sb, Te, and Se in the ratio $Ge_wSb_xTe_{y-z}Se_z$ where $36 \leqq w \leqq 42$, $7 \leqq x \leqq 13$, $48 \leqq y \leqq 54$, and $5 \leqq z \leqq 11$. More preferably, w+x+y+z=100%.

In another embodiment, between 5 and 11 atomic percent of Se is substituted for Te in the 1:2:4 alloy described above. It is preferable that the phase-change alloy comprises Ge, Sb, Te, and Se in the ratio $Ge_wSb_xTe_{y-z}Se_z$ where $11 \leqq w \leqq 17$, $25 \leqq x \leqq 31$, $53 \leqq y \leqq 59$, and $5 \leqq z \leqq 11$. More preferably, w+x+y+z=100%.

In yet another embodiment, between 5 and 11 atomic percent of Se is substituted for Te in the 2:2:5 alloy described above. It is preferable that the phase-change alloy comprises Ge, Sb, Te, and Se in the ratio $Ge_wSb_xTe_{y-z}Se_z$ where $19 \leqq w \leqq 25$, $19 \leqq x \leqq 25$, $53 \leqq y \leqq 59$, and $5 \leqq z \leqq 11$. More preferably, w+x+y+z=100%.

The modifier element may be added to the GeSbTeSe phase-change alloy. Specifically, Fe may be added to the above-mentioned optical phase-change alloy to form an optical phase-change memory material having a composition comprising Ge, Sb, Te, Se, and Fe. Preferably, the atomic percentage of the Fe is between 0.06 and 1.0. More preferably, the atomic percentage of Fe is between 0.08 and 0.8. Most preferably, the atomic percentage of Fe is about 0.3. In an alternate embodiment the Fe may be added to the optical phase-change alloy so that the atomic percentage of the Fe is about 0.1. Specific examples of optical phase-change memory materials of the present invention include, but are not limited to, $(Ge_{39}Sb_{10}Te_{44}Se_7)_{99.7}Fe_{0.3}$, $(Ge_{22}Sb_{22}Te_{47}Se_9)_{99.7}Fe_{0.3}$ and $(Ge_{14}Sb_{28}Te_{47}Se_9)_{99.7}Fe_{0.3}$.

Also disclosed herein is an optical data storage and retrieval system. The optical data storage and retrieval system comprises an optical drive means with an optical head for reading, writing and erasing optical data to an optical recording medium. The optical head may include a laser. The optical head is used to store data to and erase data from the optical recording medium. The recording medium has a recording layer comprising the optical phase-change memory material that has been disclosed above. The optical recording medium may be removable or non-removable, and may be disposed in a protective cartridge case or freestanding (i.e., not disposed in a protective case).

EXAMPLE

Experiments have been performed on a disc structure having a substrate, a first dielectric layer formed on the substrate, a recording layer formed on the first dielectric layer, and a second dielectric layer formed on the recording layer. The first dielectric layer, recording layer, and second dielectric layer have optical thicknesses equal to ¼, ½, and ½ of the 780 nm wavelength of the laser beam used as the source of optical energy. The first and second dielectric layers are formed from a mixture of ZnS and $SiO_2$. The disc radius is 3.207 cm, the disc rotation rate is 29.8 Hz, the disc linear velocity is 6 m/s, the record power is varied between 2 and 15 mW, the record frequency is 4 MHz, the pulse width is 100 ns, the erase power is 5 mW, the read power is 1.499 mW. Table 1 shows record CNR, erase CNR and erasability (record CNR—erase CNR) versus record powers between 2 and 15 mW. The recording layer in Table 1 is formed from the phase-change alloy having the composition $Ge_{40}Sb_{10}Te_{41}Se_9$. Table 2 also shows record CNR, erase C/N and erasability (record CNR—erase CNR) versus record powers between 2 and 15 mW. In Table 2, the optical phase-change memory material is formed from the phase-change alloy $Ge_{40}Sb_{10}Te_{41}Se_9$ to which 0.3% Fe had been added. (Hence, the composition is $(Ge_{40}Sb_{10}Te_{41}Se_9)_{99.7}Fe_{0.3}$. Table 3 is a comparison of the erasabilities from Tables 2 and 3. Note that, in this particular example, for record powers from 7 to 13 mW, the erasability of the recording medium having a recording layer formed from an optical phase-change materal comprising the optical phase-change alloy and 0.3% of the modifier element Fe was at least 3 dB greater than the erasability of the recording medium formed from the alloy alone without the additional modifier element. The record powers of 7 to 13 mW are above the threshold power $P_{threshold}$ and below the ablation power $P_{ablation}$ as defined above.

TABLE 1 phase-change memory material is $Ge_{40}Sb_{10}Te_{41}Se_9$

| Record Power mW | record CNR dB | erase CNR dB | erasability dB |
|---|---|---|---|
| 2 | 10.3 | 9.0 | 1.3 |
| 3 | 10.1 | 9.9 | 0.2 |
| 4 | 10.4 | 9.0 | 1.4 |
| 5 | 9.0 | 9.0 | 0.0 |
| 6 | 31.0 | 18.5 | 12.5 |
| 7 | 36.2 | 24.6 | 11.6 |
| 8 | 37.9 | 19.0 | 18.9 |
| 9 | 39.6 | 21.5 | 18.1 |
| 10 | 41.2 | 24.5 | 16.7 |
| 11 | 40.7 | 28.7 | 12.0 |
| 12 | 42.8 | 30.7 | 12.1 |
| 13 | 42.2 | 33.3 | 8.9 |
| 14 | 42.5 | 35.3 | 7.2 |
| 15 | 43.2 | 35.6 | 7.6 |

TABLE 2 phase-change memory material is $(Ge_{40}Sb_{10}Te_{41}Se_9)_{99.7}Fe_{0.3}$

| Record Power mW | record CNR dB | erase CNR dB | erasability dB |
|---|---|---|---|
| 2 | 10.8 | 8.5 | 2.3 |
| 3 | 8.6 | 10.1 | −1.5 |
| 4 | 9.5 | 10.3 | −0.8 |
| 5 | 10.5 | 9.3 | 1.2 |
| 6 | 19.2 | 9.5 | 9.7 |
| 7 | 26.0 | 9.2 | 16.8 |
| 8 | 31.4 | 9.2 | 22.2 |
| 9 | 35.0 | 9.3 | 25.7 |
| 10 | 35.8 | 11.5 | 24.3 |
| 11 | 35.6 | 15.2 | 20.4 |
| 12 | 36.5 | 20.3 | 16.2 |
| 13 | 36.4 | 22.5 | 13.9 |
| 14 | 3.6 | 2.9 | 0.7 |
| 15 | 2.5 | 2.4 | 0.1 |

TABLE 3 erasability comparison

| Record Power mW | erasability(no Fe) | erasability(with Fe) | change |
|---|---|---|---|
| 2 | 1.2 | 2.3 | 1.1 |
| 3 | 0.2 | −1.5 | −1.7 |
| 4 | 1.4 | −0.8 | −2.2 |
| 5 | 0.0 | 1.2 | −1.2 |
| 6 | 12.5 | 9.7 | −2.8 |
| 7 | 11.6 | 16.8 | 5.2 |
| 8 | 18.9 | 22.2 | 3.3 |
| 9 | 18.1 | 25.7 | 7.6 |
| 10 | 16.7 | 24.3 | 7.6 |
| 11 | 12.0 | 20.4 | 8.4 |
| 12 | 12.1 | 16.2 | 4.1 |
| 13 | 8.9 | 13.9 | 5.0 |
| 14 | 7.2 | 0.7 | −6.5 |
| 15 | 7.6 | 0.1 | −7.5 |

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. An optical recording medium comprising one or more recording layers, at least one of said recording layers comprising an optical phase-change memory material comprising:

an optical phase-change alloy comprising Ge, Sb, Te and Se; and at least one modifier element selected from the croup consisting of V, Cr, Mn, Fe, Co, Mo, Ru, Rh, Ta, W, Re, Os, and Ir, said at least one modifier element having an atomic percentage between 0.06 and 1.0, said at least one modifier element increasing the erasability of said optical recording medium.

2. The optical recording medium of claim 1, wherein said at least one modifier element is a heterogeneous nucleating agent providing heterogeneous nucleation sites.

3. The optical recording medium of claim 1, wherein said at least one modifier element is selected from the group consisting of Fe, Cr, and Mo.

4. The optical recording medium of claim 1, wherein said at least one modifier element is Fe.

5. The optical recording medium of claim 1, wherein said optical phase-change alloy comprises Ge, Sb, Te, Se in the ratio $Ge_wSb_xTe_{y-z}Se_z$ where the set of atomic percentages (w, x, y, z) is selected from the group consisting of ($36 \leqq w \leqq 42$, $7 \leqq x \leqq 13$, $48 \leqq y \leqq 54$, $5 \leqq z \leqq 11$), ($11 \leqq w \leqq 17$, $25 \leqq x \leqq 31$, $53 \leqq y \leqq 59$, $5 \leqq z \leqq 11$), and ($19 \leqq w \leqq 25$, $19 \leqq x \leqq 25$, $53 \leqq y \leqq 59$, $5 \leqq z \leqq 11$).

6. The optical recording medium of claim 1, wherein said optical phase-change alloy comprises Ge, Sb, Te and Se; and said at least one modifier element is Fe with an atomic percentage between 0.06 and 1.0.

7. An optical storage and retrieval system comprising:

an optical drive means with an optical head for reading, writing and erasing optical data to an optical recording medium, said optical recording medium comprising one or more recording layers, at least one of said recording layers comprising optical phase-change memory material comprising:

an optical phase-change alloy comprising Ge, Sb, Te and Se; and at least one modifier element selected from the group consisting of V, Cr, Mn, Fe, Co, Mo, Ru, Rh, Ta, W, Re, Os, and Ir, said at least one modifier element having an atomic percentage between 0.06 and 1.0, said at least one modifier element increasing the erasability of said optical recording medium.

8. The optical data storage and retrieval system of claim 7, wherein said at least one modifier element is a heterogeneous nucleating agent providing heterogeneous nucleation sites.

9. The optical data storage and retrieval system of claim 7, wherein said at least one modifier element is selected from the group consisting of Fe, Cr, and Mo.

10. The optical data storage and retrieval system of claim 7, wherein said at least one modifier element is Fe.

11. The optical data storage and retrieval system of claim 7, wherein said optical phase-change alloy comprises Ge, Sb, Te, Se in the ratio $Ge_wSb_xTe_{y-z}Se_z$ where the set of atomic percentages (w, x, y, z) is selected from the group consisting of ($36 \leqq w \leqq 42$, $7 \leqq x \leqq 13$, $48 \leqq y \leqq 54$, $5 \leqq z \leqq 11$), ($11 \leqq w \leqq 17$, $25 \leqq x \leqq 31$, $53 \leqq y \leqq 59$, $5 \leqq z \leqq 11$), and ($19 \leqq w \leqq 25$, $19 \leqq x \leqq 25$, $53 \leqq y \leqq 59$, $5 \leqq z \leqq 11$).

12. The optical data storage and retrieval system of claim 7, wherein said optical data storage medium is freestanding.

13. The optical data storage and retrieval system of claim 7, wherein said optical data storage medium is positioned within said optical drive means and is non-removable.

14. The optical data storage and retrieval system of claim 7, wherein said optical data storage medium is enclosed in a protective cartridge case.

15. The optical data storage and retrieval system of claim 14, wherein said protective case and said enclosed optical data storage medium are positioned within said optical drive means for active reading, writing and erasing thereof, and are removable for transportation.

* * * * *